US011265369B2

(12) United States Patent
Campbell et al.

(10) Patent No.: US 11,265,369 B2
(45) Date of Patent: Mar. 1, 2022

(54) METHODS AND SYSTEMS FOR INTELLIGENT DISTRIBUTION OF WORKLOADS TO MULTI-ACCESS EDGE COMPUTE NODES ON A COMMUNICATION NETWORK

(71) Applicant: Verizon Patent and Licensing Inc., Arlington, VA (US)

(72) Inventors: Kirk Campbell, Long Valley, NJ (US); Ravi Sharma, Freehold, NJ (US); Raghuram Parvataneni, Edison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 276 days.

(21) Appl. No.: 16/398,565

(22) Filed: Apr. 30, 2019

(65) Prior Publication Data

US 2020/0351336 A1 Nov. 5, 2020

(51) Int. Cl.
*H04L 29/08* (2006.01)
*H04W 8/22* (2009.01)
*G06F 9/50* (2006.01)
*H04L 67/1008* (2022.01)
*H04L 67/1029* (2022.01)

(52) U.S. Cl.
CPC ........ *H04L 67/1008* (2013.01); *G06F 9/5072* (2013.01); *H04L 67/1029* (2013.01); *H04W 8/22* (2013.01)

(58) Field of Classification Search
CPC .................................................. H04L 67/1008
See application file for complete search history.

(56) References Cited

U.S. PATENT DOCUMENTS

| 2013/0346465 | A1* | 12/2013 | Maltz | G06F 9/5072 |
| | | | | 709/201 |
| 2015/0026348 | A1* | 1/2015 | Siddiqui | G06F 9/5027 |
| | | | | 709/226 |
| 2018/0027060 | A1* | 1/2018 | Metsch | H04L 49/25 |
| | | | | 709/226 |

* cited by examiner

*Primary Examiner* — Nicholas P Celani

(57) ABSTRACT

An exemplary edge compute orchestration system that is communicatively coupled with a set of edge compute nodes in a communication network receives a task assignment request generated by a user equipment ("UE") device coupled to the network. The request is associated with an edge compute task that is to be performed in furtherance of an application executing on the UE device. The system also accesses node characterization data for the set of nodes and manages a node selection policy configured to facilitate a balancing of node performance and node efficiency when assigning edge computing tasks to different nodes in the set. The system selects a node for performance of the edge compute task from the set of nodes in response to the request, based on the node characterization data, and in accordance with the selection policy. The system assigns the edge compute task to be performed by the selected node.

20 Claims, 8 Drawing Sheets

METHODS AND SYSTEMS FOR INTELLIGENT DISTRIBUTION OF WORKLOADS TO MULTI-ACCESS EDGE COMPUTE NODES ON A COMMUNICATION NETWORK

BACKGROUND INFORMATION

The popularity of mobile devices and networked computing has grown immensely in recent years. As a result, large communication networks (e.g., national carrier networks, mobile phone networks, mobile data networks, etc.) continue to develop and provide network and communication services to millions of user equipment ("UE") devices such as mobile devices, stationary computing devices, Internet of Things ("IoT") devices, and so forth.

To help UE devices perform significant computing tasks efficiently and effectively, network service providers have employed distributed computing architectures in which UE devices work cooperatively with more powerful computing resources to which the UE devices are networked. For example, multi-access or mobile edge computing ("MEC") technology and other similar technologies have been used to allow UE devices to interoperate with network-edge-deployed computing resources (e.g., servers and/or other resources of the communication network that are located in relatively close physical proximity to the UE devices) to enable distributed computing between the UE devices and the network-edge-deployed resources with minimal latency.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
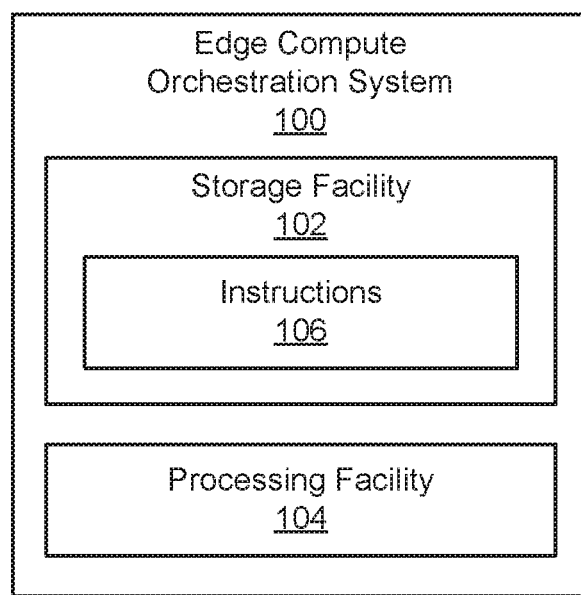
FIG. 1 illustrates an exemplary edge compute orchestration system for intelligent distribution of workloads to multi-access edge compute nodes on a communication network according to principles described herein.

Methods and systems for intelligent distribution of workloads to multi-access edge compute nodes on a communication network are described herein. For example, this intelligent distribution of workloads may be performed by selectively assigning edge compute tasks to edge compute nodes in accordance with an intelligent node selection policy and based on real-time and historical characterization data. As networked and mobile computing continues to grow in the manner described above, network service providers and others continue developing and improving distributed computing technologies whereby user equipment ("UE") devices having relatively modest computing resources interoperate with network-edge-deployed computing systems having more significant resources to more efficiently and effectively perform processing-intensive tasks with low latency. For example, applications involving real-time control systems, dynamic media transcoding, procedural generation of extended reality or gaming content, and/or various other technologies dependent on both processing requirements and latency requirements being met all may be well-served by distributed computing technologies described herein.

As will be described in more detail below, certain implementations of such technologies may involve an edge compute orchestration system that is communicatively coupled with a set of edge compute nodes in a communication network. The set of edge compute nodes may include network-edge-deployed resources implemented with varying degrees of computing power and ubiquity. For example, the set may include a large number of edge compute nodes with relatively modest computing capabilities, a smaller number of edge compute nodes each having more significant computing capabilities, and an even smaller number of edge compute nodes that each have extremely high computing capabilities.

The edge compute orchestration system may implement the distributed computing technology described herein by performing at least some of the following operations. The edge compute orchestration system may receive a task assignment request generated by a UE device communicatively coupled to the communication network. For instance, the task assignment request may be associated with an edge compute task that is to be performed in furtherance of an application executing on the UE device. The edge compute orchestration system may also access node characterization data representative of characteristics of the set of edge compute nodes, and may manage a node selection policy configured to facilitate a balancing of node performance and node efficiency for edge computing tasks that are to be assigned to be performed by particular edge compute nodes in the set of edge compute nodes.

The balancing that the node selection policy facilitates is performed as a response to two competing goals that various applications and use cases described herein each share. First, it is desirable for any network-edge-deployed resources at edge compute nodes in the set of edge compute nodes to be able to meet minimum processing requirements and maximum latency requirements for specific edge compute tasks that are assigned to the edge compute nodes. In theory, this first goal could be accomplished by deploying powerful computing resources to a ubiquitous number of edge compute nodes thoroughly covering any geography at which a UE device may be located. Unfortunately, due to cost and logistical realities, it is of course not possible to deploy an infinite number of resources to provide unlimited computing power to UE devices at every possible geographical location. As such, a second goal arises that relates to achieving the illusion of unlimited computing resources in the most efficient and realistic way possible. For example, the second goal may be to deploy and maintain sufficient computing resources to deliver on the processing and latency required of the network in a way that is practical and cost-efficient to implement. This second goal may thus be accomplished by consolidating computing resources to fewer and larger centralized nodes, thus limiting the amount of resources that need to be deployed and maintained at smaller and more localized nodes. As will be described in more detail below, these two goals may both be addressed and achieved by intelligent distribution of workloads to multi-access edge compute nodes in a manner that accounts for node performance (e.g., ensuring that processing and latency parameters are met in accordance with the first goal) while also accounting for node efficiency (e.g., ensuring that more centralized and cost-efficient edge compute nodes are used to the extent possible to limit reliance on more localized and costly edge compute nodes).

The edge compute orchestration system may thus select, from the set of edge compute nodes, an edge compute node for performance of the edge compute task. For example, this selecting of the edge compute node may be performed in response to the received task assignment request, based on the accessed node characterization data, and in accordance with the node selection policy. In this way, an optimal edge compute node may be selected that is both 1) capable of meeting the processing and latency parameters of the edge compute task, and 2) does not require more inefficient localization of computing resources than is necessary. The edge compute orchestration system may therefore assign the edge compute task to be performed by the selected edge compute node, thereby balancing the competing goals of performance and efficiency described above.

By addressing and balancing both of these goals, edge compute orchestration methods and systems described herein may provide various significant benefits. For example, methods and systems described herein may significantly increase efficiency of communication networks providing support for distributed computing technologies (e.g., MEC technologies, etc.), and may thereby significantly decrease deployment and maintenance costs and barriers that impede these networks. As a result, network service providers may be enabled to more efficiently deploy and maintain hardware and software resources at thousands of nodes to enable large numbers of end users in diverse geographies to use and enjoy the services such networks provide.

Additionally, all of these efficiencies brought about by methods and systems described herein do not come at the expense of application performance (e.g., increased latency perceivable by end users, slower processing or less processing throughput, etc.). To the contrary, the efficiencies gained as a result of methods and systems for intelligent distribution of workloads to multi-access edge compute nodes are achieved in a manner configured to meet designated performance parameters for individual applications without needlessly exceeding those performance requirements in ways that would lead to inefficiency. For example, if certain control loops employed by a first application only function correctly with latency less than 2 milliseconds ("ms") while generation of audio data by a second application is perceived by users to be instantaneous with any latency less than 50 ms, methods and systems described herein may ensure that performance requirements for both applications are met in an efficient way by assigning higher-cost localized resources only to the first application, while assigning lower-cost centralized resources to the second application (since the second application can bear the additional latency).

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary edge compute orchestration system 100 ("system 100") for intelligent distribution of workloads to multi-access edge compute nodes on a communication network. Specifically, as shown, system 100 may include, without limitation, a storage facility 102 and a processing facility 104 selectively and communicatively coupled to one another. Facilities 102 and 104 may each include or be implemented by hardware and/or software components (e.g., processors, memories, communication interfaces, instructions stored in memory for execution by the processors, etc.). In some examples, facilities 102 and 104 may be distributed between multiple devices and/or multiple locations as may serve a particular implementation. Each of facilities 102 and 104 within system 100 will now be described in more detail.

Storage facility 102 may maintain (e.g., store) executable data used by processing facility 104 to perform any of the functionality described herein. For example, storage facility 102 may store instructions 106 that may be executed by processing facility 104. Instructions 106 may be executed by processing facility 104 to perform any of the functionality described herein, and may be implemented by any suitable application, software, code, and/or other executable data instance. Additionally, storage facility 102 may also maintain any other data accessed, managed, used, and/or transmitted by processing facility 104 in a particular implementation.

Processing facility 104 may be configured to perform (e.g., execute instructions 106 stored in storage facility 102 to perform) various functions associated with intelligent distribution of workloads to multi-access edge compute nodes on a communication network. For example, processing facility 104 may be configured to receive a task assignment request generated by a UE device communicatively coupled to a communication network, and to access (e.g., receive, input, load, generate, etc.) node characterization data representative of characteristics of a set of edge compute nodes that are communicatively coupled with the system in the communication network. In some examples, the task assignment request may be associated with (e.g., may correspond to and/or include information representative of) an edge compute task that is to be performed in furtherance of an application executing on the UE device.

Processing facility 104 may further be configured to manage a node selection policy. For instance, as mentioned above, the node selection policy may be configured to facilitate a balancing of node performance and node efficiency for edge computing tasks that are to be assigned to be performed by particular edge compute nodes in the set of edge compute nodes.

Node performance may refer to latency, processing, and/or other aspects of the computing performance of a particular edge compute node. As such, node performance will be understood to correspond to the first of the two competing goals of distributed computing described above. Optimal node performance is generally achieved when a high degree of processing is accomplished with a low degree of latency. To this end, it is desirable for a node being used to perform an edge compute task to have as many high-caliber computing resources as possible and to be as local (e.g., geographically proximate) to the UE device as possible. The goal of node performance, however, tends to limit, and to be limited by, an opposing goal of node efficiency.

Node efficiency may refer to efficient usage of computing resources that have been deployed in connection with particular nodes and that continue to require updates, maintenance, and so forth, that may be more or less efficient to perform based on how consolidated the resources are, what percentage of resources are available at any given time, and so forth. Optimal node efficiency is generally achieved when an edge compute node selected to perform a given edge compute task includes a large wealth of computing resources (e.g., parallel processors, large memories and storage resources, etc.) and is thus more efficient to implement, deploy, maintain, and otherwise operate than other capable edge compute nodes would have been if they had been selected to perform the edge compute task. As such, node performance and node efficiency may be said to be balanced in an appropriate, optimal, or ideal manner when edge compute nodes selected for performing edge compute tasks are qualified to meet performance requirements without being needlessly overqualified to do so. For example, as will be described in more detail below, it would be more efficient to assign an edge compute task to a centralized edge compute node (e.g., a relatively low-performance and high-efficiency node) rather than to a localized edge compute node (e.g., a relatively high-performance and low-efficiency node) if the performance provided by either edge compute node is capable of meeting the parameters required by the edge compute task. Even though the more localized edge compute node may be capable of providing better performance (e.g., lower latency), for example, it would be less optimal to assign an edge compute task to the localized edge compute node if the higher-efficiency centralized edge compute node is also capable of satisfying performance parameters associated with the task.

Accordingly, having received the task assignment, accessed the node characterization data, and managed the node selection policy, processing facility 104 may be configured to select, from the set of edge compute nodes, an edge compute node for performance of the edge compute task. For example, processing facility 104 may be configured to select an edge compute node that balances node performance and node efficiency in an appropriate or optimal manner (e.g., the most optimal manner possible, an optimal manner that satisfies a predetermined criteria or threshold (even if not the most optimal manner possible), etc.). To accomplish this, processing facility 104 may select the edge compute node in response to the received task assignment request, based on the accessed node characterization data, and in accordance with the node selection policy. Once an edge compute node is selected from the set of edge compute nodes, processing facility 104 may assign the edge compute task to be performed by the selected edge compute node.

In some examples, system 100 may be configured to operate in real time so as to receive, access, manage, and/or process the data described above (e.g., task assignments, node characterization data, node selection policy data, etc.) dynamically as the data is generated or otherwise becomes available. As a result, system 100 may select edge compute nodes to which to assign edge compute tasks immediately after being requested to do so and based on timely, real-time data. As used herein, operations may be performed in "real time" when they are performed immediately and without undue delay. In some examples, real-time data processing operations may be performed in relation to data that is highly dynamic and time sensitive (i.e., data that becomes irrelevant after a very short time). As such, real-time operations may selectively assign tasks to multi-access edge compute nodes on a communication network while the data upon which the assignments are made continues to be relevant and up-to-date.

Figure 2:
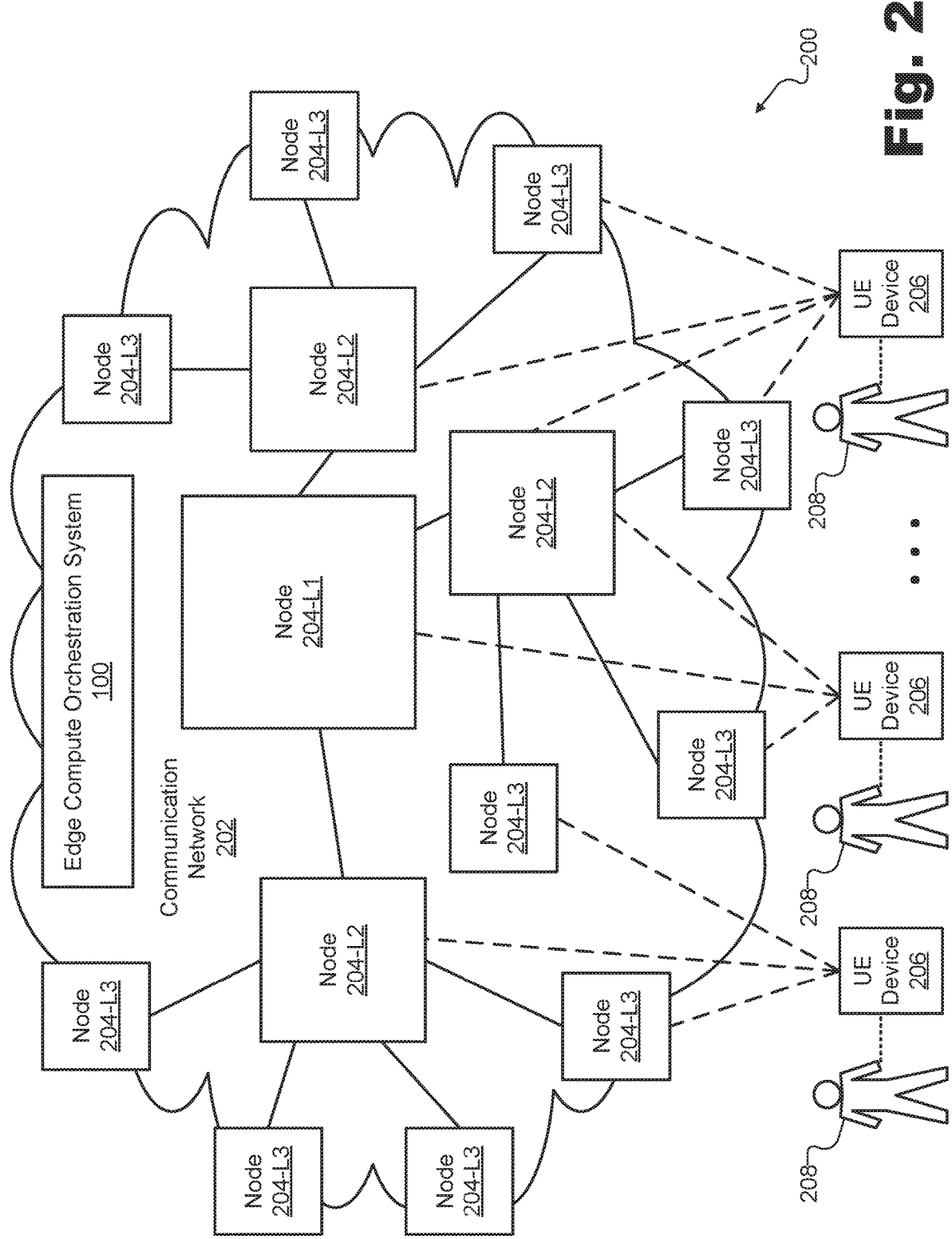
FIG. 2 illustrates an exemplary configuration within which the edge compute orchestration system of FIG. 1 may operate according to principles described herein.

FIG. 2 illustrates an exemplary configuration 200 within which system 100 may operate. Specifically, as shown in configuration 200, system 100 is associated with a communication network 202 that includes a plurality of edge compute nodes 204 ("nodes" 204-L1, 204-L2, and 204-L3). For example, system 100 may be implemented by computing resources that are communicatively coupled to and/or interconnected by way of communication network 202, which may connect to or be at least partially implemented by nodes 204. Configuration 200 also shows a plurality of UE devices 206 each associated with (e.g., used by) a respective user 208. Each of the components of configuration 200 shown in FIG. 2 will now be described in more detail.

Communication network 202 may include and/or be implemented by any type of computing, communications, and/or networking technologies as may serve to distribute data between UE devices 206 or between a UE device 206 and another computing system such as one of nodes 204 and/or another computing system not explicitly shown in configuration 200. Communication network 202 may include or be implemented by a provider-specific wired or wireless network (e.g., a cable or satellite carrier network, a mobile telephone network, a traditional telephone network, a broadband cellular data network, etc.), the Internet, a wide area network, a content delivery network, and/or any other suitable network or networks. As such, data may be communicated over communication network 202 using any suitable communication technologies, devices, media, and/or protocols implemented or employed by communication network 202 to serve a particular implementation.

System 100, which was described above in relation to FIG. 1, may be configured in any suitable manner with respect to communication network 202 and the other components shown in configuration 200. For example, system 100 may be implemented by computing resources included within a particular node 204, may be distributed across computing resources of multiple nodes 204, may be implemented by computing resources integrated or communicatively coupled with communication network 202 but independent from any particular node 204, or may be implemented in any other manner or by any other computing resources as may serve a particular implementation. In certain examples, system 100 may be deployed in a centralized location using a significant number of efficient, centralized computing resources. For instance, if communication network 202 covers a large geographical area (e.g., all or a large portion of the United States), system 100 may be implemented by various powerful servers at a centralized data center that may or may not also host an edge compute node (e.g., node 204-L1, one of nodes 204-L2, etc.).

Because system 100 is communicatively coupled to communication network 202, system 100 may communicate over the network with nodes 204, UE devices 206, various node characterization tools configured to provide characterization data (as will be described in more detail below), and/or additional components not explicitly shown in configuration 200. In some implementations (e.g., implementations in which communication network 202 covers a particularly large area), multiple edge compute orchestration systems (i.e., multiple instances of system 100 or different implementations thereof) may all be included on communication network 202 and may be in communication with one another to coordinate the orchestration efforts described herein for the entire network. In some examples, this plurality of edge compute orchestration systems may be independent from one another, while, in other examples, the edge compute orchestration systems may be configured to share data (e.g., policy data, etc.) with one another.

Configuration 200 shows several nodes 204 each labeled and sized in accordance with how many computing resources are included within the node. While a relatively small number of nodes 204 are shown in FIG. 2, it will be understood that a large (e.g., nationwide) communication network may include hundreds or thousands of nodes distributed across the area covered by the communication network. For example, a large communication network may include several nodes 204-L1, hundreds of nodes 204-L2, and thousands of nodes 204-L3.

As used herein, an "edge compute node" such as any of nodes 204 will be understood to refer to a discrete set of computing resources (e.g., a server, a set of servers, etc.) that is associated with a communication network such as communication network 202 and is capable of performing edge compute tasks assigned to the edge compute node. Edge compute nodes are so named not necessarily because every such node is at the "edge" of a network (i.e., being directly in communication with UE devices 206 rather than being in indirect communication with the UE devices from a more centralized location), but because each edge compute node is configured to provide edge compute services associated with edge compute technologies (e.g., MEC technologies, etc.) of a cellular network such as a 5G cellular network or any other suitable cellular network associated with any other suitable generation of technology. Accordingly, in some examples, a node 204 may be owned and maintained by a network service provider such as a cellular carrier company, while, in other examples, a node 204 may be more localized to UE devices 206 such as by being implemented by computing resources on a same local area network with one of UE devices 206 (e.g., by computing resources located within a home or office of the corresponding user 208), or the like.

As mentioned above, differently-sized squares and different labels are used in FIG. 2 to illustrate some different types of nodes 204 that may be included on communication network 202. Specifically, configuration 200 shows, as an example, three different levels L1, L2, and L3 of edge compute nodes labeled as nodes 204-L1, 204-L2 and 204-L3, respectively. While three distinct levels of edge compute nodes are shown and described herein, it will be understood that a wide spectrum of different-sized edge compute nodes (e.g., having a more continuous range of sizes and including more than just the three exemplary levels described herein) may be employed in certain embodiments as may serve those implementations.

Level 1 nodes (e.g., node 204-L1) may be categorized as central edge compute nodes or edge compute nodes that fall into a central edge compute node category. As illustrated by the large size of node 204-L1, central edge compute nodes will be understood to be the largest and most centralized type of edge compute node described herein. For example, node 204-L1 may be implemented by a network equipment center (e.g., a large data center with hundreds or thousands of powerful servers and other computing resources). Node 204-L1 may simultaneously handle millions of edge compute tasks from thousands or millions of UE devices, and may do so in a most efficient manner due to the centralized nature of all the computing resources. However, as described above, while the efficiency and cost of performing edge compute tasks on such centralized nodes may be ideal for the goal of node efficiency, node 204-L1 may be located far away (e.g., hundreds of miles) from certain UE devices 206 that the node is configured to serve, thereby necessarily compromising, at least for these UE devices, the node performance goal. For example, the travel-time latency required for certain UE devices 206 to use node 204-L1 may be at least 20-30 ms or about ten times more latency as could be provided by a more localized edge compute node. Because only a few (e.g., less than 100, less than 10, etc.) central edge compute nodes may be included on a large communication network, configuration 200 shows only a single node 204-L1 to be included on communication network 202.

Level 2 nodes (e.g., nodes 204-L2) may be categorized as intermediate edge compute nodes or edge compute nodes that fall into an intermediate edge compute node category. As illustrated by the medium size of nodes 204-L2, intermediate edge compute nodes will be understood to be smaller and less centralized than central edge compute nodes, but still larger and more centralized than local edge compute nodes described below. For example, nodes 204-L2 may be implemented by service aggregation points on communication network 202 (e.g., smaller data centers with many powerful servers and other computing resources but fewer than described above in relation to central edge compute nodes such as node 204-L1). Each node 204-L2 may simultaneously handle thousands of edge compute tasks from hundreds or thousands of UE devices 206, and may do so in a relatively efficient manner, although less efficient than the central edge compute nodes described above. While the efficiency and cost of performing edge compute tasks on intermediate edge compute nodes such as nodes 204-L2 may be less ideal than the central edge compute nodes for the goal of node efficiency, nodes 204-L2 may advantageously be distributed to be located much closer (e.g., within a hundred miles) to many UE devices 206 that the nodes are configured to serve, thereby providing improvements in the node performance goal over node 204-L1. For example, the travel-time latency required for certain UE devices 206 to use nodes 204-L2 may be around 5-15 ms, which is significantly less than the latency associated with node 204-L1 described above. Because several dozen to a few hundred intermediate edge compute nodes may be included on a large communication network, configuration 200 shows a few nodes 204-L2 to be included on communication network 202.

Level 3 nodes (e.g., nodes 204-L3) may be categorized as local edge compute nodes or edge compute nodes that fall into a local edge compute node category. As illustrated by the small size of nodes 204-L3, local edge compute nodes will be understood to be even smaller and more widely distributed (i.e., more localized to more places) than the intermediate edge compute nodes described above such as nodes 204-L2. For example, nodes 204-L3 may be implemented at centralized radio access network hubs (C-RAN hubs) associated with local cells of a cellular network, and may include computing resources that, while potentially just as capable as resources of central and intermediate edge compute nodes described above in terms of performance, may be fewer in number (e.g., fewer server resources, fewer processor resources, etc.). Each node 204-L3 may simultaneously handle hundreds of edge compute tasks from dozens or hundreds of UE devices 206. The node performance of these tasks may be ideal because of the localized nature of nodes 204-L3 with respect to UE devices 206. For example, nodes 204-L3 may typically be located within just a few miles (e.g., less than about 10 miles, and often within 1 mile) of the UE devices 206 that the nodes are servicing, thereby enabling nodes 204-L3 to have a travel-time latency of just 1-3 ms in some examples, or even less than 1 ms in other examples. As mentioned above, while this low latency is ideal for the goal of node performance, the goal of node efficiency is compromised by excessive use of nodes 204-L3. This is because there may be thousands of nodes 204-L3 deployed in a large communication network, thereby making deployment and maintenance of significant computing resources to every node 204-L3 in every local geography extensive. Because thousands of local edge compute nodes may be included in a large communication network, configuration 200 shows a relatively large number of nodes 204-L3 to be scattered across communication network 202.

UE devices 206 may represent any suitable computing devices configured to be used by an end user directly or otherwise deployed or embedded in objects for indirect use by consumers, researchers, or others (e.g., for Internet of Things ("IoT") applications, etc.). For example, UE devices 206 may include mobile devices (e.g., smart phones, tablet devices, laptop computers, etc.), stationary devices (e.g., desktop computers, intelligent home systems, etc.), IoT devices (e.g., smart appliances, smart automobiles, smart sensors used for research purposes, etc.), and so forth. While only a few UE device 206 are shown in configuration 200, it will be understood that for a large communication network such as a nationwide carrier network, thousands or millions of UE devices 206 associated with thousands or millions of users 208 may be communicatively coupled to the network. Each of UE devices 206 will be understood to be communicatively coupled to communication network 202. For example, as will be described in more detail below, each UE device 206 may be directly coupled to at least one node 204 (e.g., by way of wireless communication), or may be indirectly coupled to at least one node 204 by way of network components of communication network 202 that are not explicitly shown.

Figure 3:
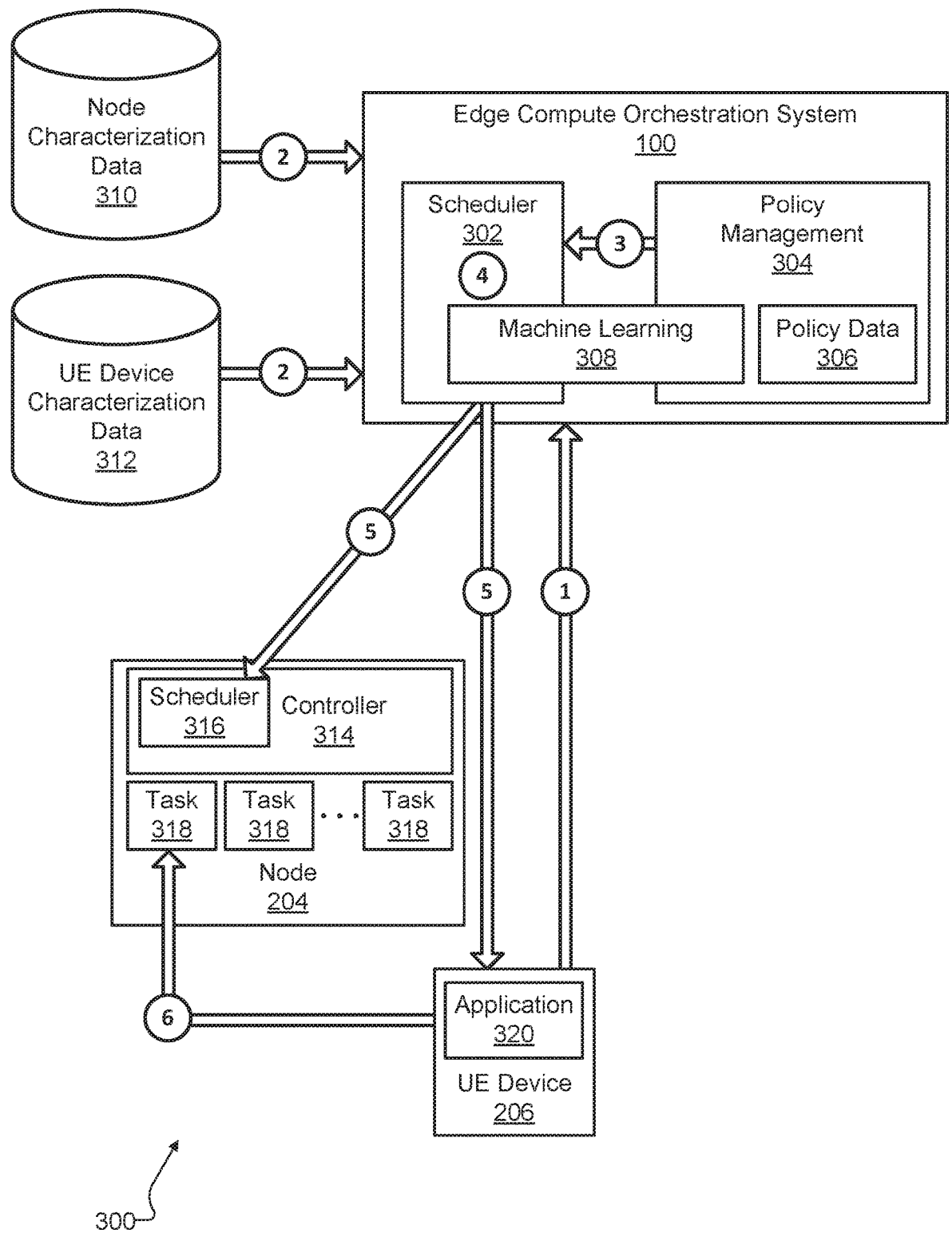
FIG. 3 illustrates an exemplary performance of a selective assigning of an edge compute task to an edge compute node on a communication network according to principles described herein.

FIG. 3 illustrates a performance 300 of a selective assigning of an edge compute task to an edge compute node on a communication network. Specifically, as shown, FIG. 3 depicts functional views of certain components of configuration 200 including a functional view of system 100, a functional view of an exemplary edge compute node 204 ("node 204") that may be implemented as any of the levels or categories of edge compute nodes described above, and a functional view of an exemplary UE device 206. While communication network 202 is not explicitly shown in FIG. 3, it will be understood that the communications described below to carry out performance 300 may utilize communication network 202 in any of the ways described herein.

In FIG. 3, the functional view of system 100 is shown to include a scheduler 302 configured to perform node selection and scheduling assignments, a policy management block 304 configured to manage a node selection policy based on a set of policy data 306, and an implementation of machine learning technology 308 configured to assist scheduler 302 in node selection and to assist policy management block 304 in managing the node selection policy. Details regarding exemplary functionality of each of these components of system 100 will be described in more detail below in conjunction with a description of various operations performed as part of performance 300. As further illustrated in FIG. 3, system 100 accesses characterization data such as node characterization data 310 and UE device characterization data 312.

The functional view of node 204 is shown in FIG. 3 to include a scheduling controller 314 ("controller 314") that receives instruction from scheduler 302 of system 100 and, using a scheduler 316 to account for localized scheduling concerns that are not accounted for by scheduler 302, schedules and performs a plurality of edge compute tasks 318 ("tasks 318").

The functional view of UE device 206 is shown in FIG. 3 to include an application 320 that is executing on UE device 206 and that includes one or more edge compute tasks (e.g., one or more of tasks 318) that are to be performed externally by an edge compute node rather than locally by local resources of UE device 206.

Performance 300 is shown to include (or to be accomplished by) a plurality of operations labeled in FIG. 3 as circled numbers 1 through 6 and referred to herein as Operation 1 through Operation 6, respectively. As shown, certain of the operations are illustrated to be associated with an arrow from one of the components to another. Such arrows may represent the movement of data, the providing of instructions, or any other suitable influence that one component may exert on another. While the operations of performance 300 are numbered in a particular sequence that may be one suitable sequence for the operations to be performed, it will be understood that, in certain examples, performance 300 could also be accomplished by performing the operations in another suitable order different from the order shown, and/or by performing at least some of the operations concurrently or in parallel with one another, rather than sequentially. Operations 1 through 6 will now be described in detail with reference to the components of FIG. 3, as well as with reference to FIGS. 4 through 6.

Operation 1 represents a receiving by system 100 of a task assignment request that is generated by UE device 206. For example, as has been mentioned, the task assignment request may be associated with an edge compute task that is to be performed in furtherance of application 320, which is executing on UE device 206. As used herein, an application executing on a UE device will be understood to broadly refer to any set of instructions that is executed by one or more processing resources included on the UE device. For example, such applications may include user-downloaded or provider-supplied mobile applications ("apps"), enterprise or consumer software, web-based software, operating system software, background services, embedded software, or any other software or programs as may serve a particular implementation.

While application 320 is referred to being "executed" by UE device 206, it will be understood that the execution of application 320 on UE device 206 is only a partial execution in a sense, because at least some functionality (e.g., relatively minor tasks in certain examples and up to nearly all of the functionality in other examples) of application 320 designated to be offloadable, and may thus by performed by an external device such as an edge compute node during the execution of application 320. For instance, in certain examples, application 320 may offload certain tasks as largely a convenience to help application 320 run more smoothly on the resources of UE device 206, to use less battery power of UE device 206, or the like. In other examples, application 320 may require heavy, low-latency processing that cannot be reasonably performed locally on the resources of UE device 206, or by a standard cloud service (e.g., a non-network-edge-deployed server that would have longer latencies than any of nodes 204 described herein).

The one or more tasks making up this offloadable functionality of application 320 may be referred to herein as "workloads" or "edge compute tasks," and may include any computing operations, instructions, or other computational work associated with application 320 and offloadable to an edge compute node such as one of nodes 204. For example, such edge compute tasks may include applications, lambda functions, services, or other suitable workloads, and may be offloaded (e.g., by necessity or for convenience) to UE device 206 while other tasks are performed locally by onboard resources of UE device 206, thereby enabling, facilitating, and/or enhancing the functionality of application 320.

In Operation 1, the task assignment request may be generated by UE device 206 and received by system 100 in any suitable way. For example, UE device 206 may generate data representative of the task assignment request when application 320 has a task that requires or could benefit from being performed by an edge compute node, and may transmit this data to system 100 by way of communication network 202 and any devices or technologies included therein. In some examples, Operation 1 may also include a verification step wherein system 100 analyzes the received task assignment request and verifies that UE device 206 meets various qualifications (e.g., registration qualifications, etc.) for requesting the task assignment, as well as that an edge compute task associated with the task assignment request is recognized and qualifies to be assigned to a particular edge compute node on communication network 202.

In Operation 2, system 100 accesses characterization data that system 100 can use to make appropriate (e.g., optimally balanced) task assignments. For example, based on the characterization data accessed in Operation 2, appropriate nodes 204 are assigned to perform appropriate tasks 318 for appropriate UE devices 206, thereby balancing the competing goals of node performance and node efficiency that have been described. As shown by the Operation 2 arrows originating from both node characterization data 310 and UE device characterization data 312 in FIG. 3, the characterization data accessed by system 100 may comprise various suitable types of data provided by any of various data sources (e.g., including, in some examples, from system 100 itself).

Figure 4:
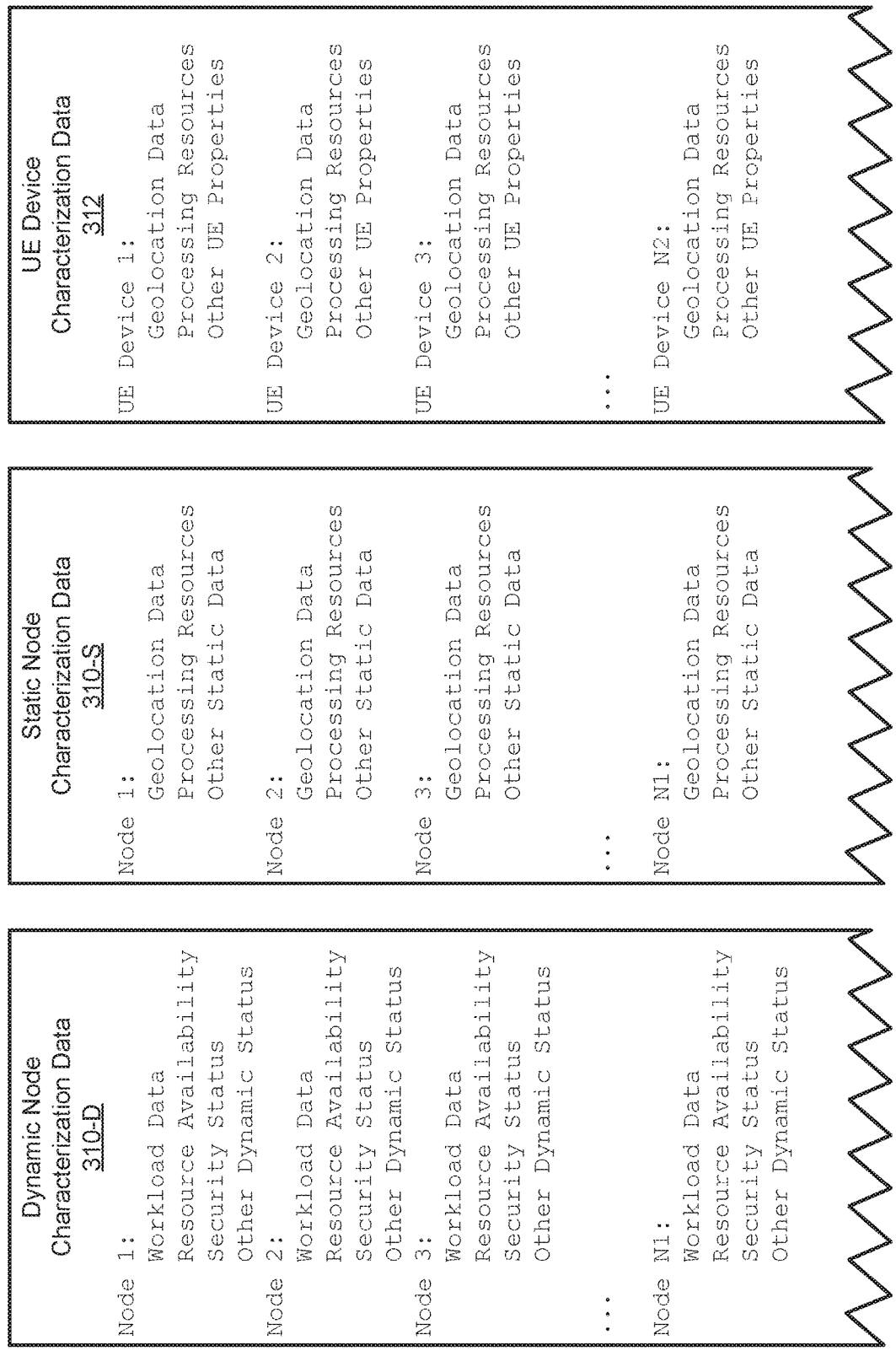
FIG. 4 illustrates various exemplary types of characterization data used by the edge compute orchestration system of FIG. 1 to selectively assign the edge compute task to the edge compute node according to principles described herein.

To illustrate, FIG. 4 shows various exemplary types of characterization data that may be accessed and used by system 100 to selectively assign an edge compute task (e.g., the edge compute task associated with the task assignment request received in Operation 1) to an appropriate edge compute node 204. Specifically, as shown in FIG. 4, node characterization data 310 may be divided into dynamic node characterization data 310-D and static node characterization data 310-S, each of which represents data describing various edge compute nodes 204 (e.g., "Node 1" through "Node N1," where N1 represents a number of edge compute nodes 204 that are included in communication network 202), while UE device characterization data 312 represents data describing various UE devices 206 (e.g., "UE Device 1" through "UE Device N2," where N2 represents a number of UE devices 206 connected to communication network 202).

One type of characterization data accessed by system 100 is dynamic node characterization data 310-D for each node 204 that is included in communication network 202 and/or is being considered as a possible candidate for assigning the edge compute task associated with the request of Operation 1. Dynamic node characterization data refers to data representing node characteristics that may change relatively often (e.g., from moment to moment, from hour to hour, from day to day, etc.) and that thus may be desirable to account for with frequent and/or real-time updates. For example, as shown under each of Nodes 1 through N1 in FIG. 4, the characteristics of nodes 204 represented by dynamic node characterization data 310-D may include data representative of a dynamic workload of each node 204 ("Workload Data"), a dynamic resource availability of each node 204 ("Resource Availability"), a dynamic security status of each node 204 ("Security Status"), and other dynamic status of each node 204.

The dynamic workload of each node 204 may be represented by real-time or near-real-time data representative of how busy each node 204 is in relation to its total capacity. For example, workload data may include statistical data indicative of how many tasks 318 are being handled by each node 204, how many tasks 318 could theoretically be handled by these nodes 204, how much latency is being measured for different tasks 318 being performed for different UE devices 206 offloading tasks to different nodes 204, how much latency is expected for these tasks 318, and so forth.

The resource availability of each node 204 may be similar to the dynamic workload, but may be more focused on the current capacity that each node 204 has for taking on additional tasks. For example, the resource availability may be represented by real-time or near-real-time statistics indicative of which node resources are being used and which are available, which tasks have been scheduled or are anticipated to be scheduled in the near future to consume some of the available resources, which tasks are nearly complete and will thus leave resources free in the near future, and so forth.

The security status of each node 204 may be represented by real-time or near-real-time data representative of whether anomalies that could be associated with security issues have been detected for certain tasks 318, applications 320, nodes 204, or at any other level. For example, if an entire node 204 is detected to be subject to a denial of service attack, data representative of the security status of that node 204 may indicate that no new tasks are to be assigned to the node until the security issue is indicated to have been resolved. In other examples, a particular application 320 or task 318 may be unregistered or may attempt to perform an illegal operation on one particular node 204. As a result, data representative of the security status of that application or task may indicate that the task or other tasks from the application should not be assigned to any nodes 402 until the security status indicates that the issue has been resolved.

Other dynamic status may be representative of each specific node 204 or may represent other things related to nodes 204 other than the nodes themselves. For example, other dynamic status represented in dynamic node characterization data 310-D may include Radio Network Information ("RNI") representative of the communication network itself, rather than the nodes 204 included on the network. For example, when data is sent over the network (e.g., from one node 204 to another, or from a node 204 to a UE device 206), RNI may be recorded to indicate how long various network devices take to move the data so that it can be determined whether network latencies are being accurately predicted and accounted for.

Another type of characterization data accessed by system 100 is static node characterization data 310-S for each node 204 that is included in communication network 202 and/or is being considered as a possible candidate for assigning the edge compute task associated with the request of Operation 1. Static node characterization data 310-S refers to data representing node characteristics that do not change often but rather remain relatively static over time and thus may be accounted for with less frequent updates or without updates. For example, as shown under each of Nodes 1 through N1 in FIG. 4, the characteristics of nodes 204 represented by static node characterization data 310-S may include data representative of a static geographical location of each node 204 ("Geolocation Data"), a static list of processing resources included in each node 204 ("Processing Resources"), and other dynamic status data of each node 204.

The geolocation data of each node 204 may be represented by latitude and longitude coordinates or by any other type of geographical indicator associated with any suitable geolocational coordinate system. The processing resources data for each node 204 may indicate what type of processing resources are included within the node 204, regardless of whether the resources are currently in use to perform edge compute tasks. For example, static node characterization data 310-S may indicate that a particular node 204 has a particular number of processors of a particular speed, a particular amount of memory, a particular network bandwidth, and so forth, while dynamic node characterization data 310-D may indicate the extent to which those resources are in use or are available at any given time. Other static data for a particular node 204 may include information that may enable a UE device 206 to communicate with the node 204, such as addressing information for the node or the like.

Together with node characterization data 310 (i.e., dynamic data 310-D and static data 310-S), another type of characterization data that may be accessed by system 100 is UE device characterization data 312, which is representative of characteristics of each UE device 206 associated with communication network 202 and/or with system 100. As will be described in more detail below, UE device characterization data 312 is useful because system 100 may perform the selecting of a node 204 based on both node characterization data 310 and UE device characterization data 312.

UE device characterization data 312 may refer to data representing UE device characteristics that may be dynamic or static, and that may be helpful in selecting the most optimal node 204 for a given task associated with the UE devices. For example, as shown under each of UE Devices 1 through N2 in FIG. 4, the characteristics of UE devices 206 represented by UE device characterization data 312 may include data representative of a dynamic geographical location of the UE device 206 ("Geolocation Data"), a static list of processing resources included in each UE device 206 ("Processing Resources"), and other dynamic or static properties of each UE device 206 ("Other UE Properties").

As with the geolocation data of each node 204, geolocation data for each UE device 206 may be represented by latitude and longitude coordinates or by any other type of geographical indicator associated with any suitable geolocational coordinate system. However, because many UE devices 206 may be mobile devices that are dynamically moving around in the world with respect to communication network 202 and nodes 204, the geolocation of UE devices 206 may be dynamically changing.

Similar to the processing resources data for each node 204, the processing resources data for each UE device 206 may indicate what type of processing resources are included within the UE device 206. This may be helpful to provide system 100 with information regarding what the UE device 206 is able to reasonably process on its own and what processing will be required to be performed by a selected node 204.

Each type of characterization data 310 or 312 may be generated by any suitable device, system, or tool, and may be accessed in any manner as may serve a particular implementation. For example, certain types of characterization data may be generated specifically to facilitate node selection by system 100 as described herein, and may have no other purpose. In these examples, the characterization data may be generated by tools that are integrated into system 100 or that are otherwise associated with communication network 202 by being integrated into nodes 204, UE devices 206, or other devices or systems communicatively coupled with communication network 202. Other types of characterization data may be generated in the normal course of network or UE device operation for various purposes that include purposes unrelated to node selection processes of system 100. Regardless, each type of characterization data may be transmitted to or otherwise provided to system 100 automatically, or system 100 may request and receive such data on an as-needed basis.

Returning to FIG. 3, after characterization data 310 and/or 312 is accessed by Operation 2, performance 300 depicts Operation 3 as an arrow from policy management block 304 to scheduler 302. This arrow represents the managing of the node selection policy and the use of that node selection policy by scheduler 302 as scheduler 302 selects an edge compute node for performance of the edge compute task in Operation 4 (as will be described in more detail below). While the use of the node selection policy in Operation 3 may only occur when a task assignment request has been received (see Operation 1) and system 100 is selecting an edge compute node for performance of an edge compute task associated with that request (see Operation 4), it will be understood that the managing of the node selection policy may be ongoing as characterization data (e.g., particularly dynamic forms of characterization data such as dynamic node characterization data 310-D) is accessed and updated to reflect dynamically changing realities of various nodes 204 and other aspects of communication network 202 (see Operation 2).

Policy management block 304 may refer to any computing resources of system 100 that are configured to manage the node selection policy in any suitable manner, regardless of whether those computing resources are dedicated only to policy management or are also configured to perform other tasks. In some implementations, managing a node selection policy may entail storing and providing (e.g., to scheduler 302 as appropriate) policy data 306 that is configured to facilitate the balancing of the node performance and the node efficiency for edge compute tasks. Additionally, along with storing and providing policy data 306, certain implementations of policy management block 304 may be configured to update policy data 306 as additional characterization data (e.g., dynamic characterization data such as real-time node performance statistics, etc.) is accessed.

As illustrated by machine learning technology 308, policy management block 304 may further be configured, in certain examples, to use machine learning technologies to improve the balancing of the node performance and the node efficiency for the edge compute tasks. For example, supervised machine learning techniques may be used to perform pattern recognition within sets of characterization data, classification of characterization data, regression analysis for characterization data, or the like. In some examples, classification and/or regression analysis may be performed using a k-nearest neighbors ("k-NN") algorithm or another suitable machine learning technique as may serve a particular implementation.

In these or other suitable ways, machine learning technology 308 may help update policy data 306 based on node characterization data 310 and/or UE device characterization data 312 that is accessed in Operation 2, as well as based on historical characterization data accessed previously. Machine learning technology 308 may help define, develop, and improve the node selection policy by identifying trends and making predictions that ultimately help result in more optimal node selections by scheduler 302. For example, machine learning technology 308 may identify usage trends related to different times of day (e.g., a trend that usage of nodes 204 tends to increase after working hours and to decrease during sleeping hours, etc.), different times of week (e.g., a trend that usage of nodes 204 tends to increase on weekends as compared to weekdays, etc.), different times of year (e.g., a trend that usage of nodes 204 tends to increase during summer months and to decrease during winter months, etc.), or the like. By identifying such trends, the node selection policy may be improved to help scheduler 302 make optimal node selection decisions under various circumstances (e.g., at different times, etc.). Thus, for example, as system 100 adheres to a continuously evolving and improving node selection policy, system 100 might be more likely to assign higher performance nodes 204 (e.g., nodes 204-L3) to edge compute tasks that are scheduled during non-peak times (e.g., in the middle of the night), while being more likely to assign higher efficiency nodes 204 (e.g., nodes 204-L1 or 204-L2) to edge compute tasks that are scheduled during times when the network is busier (e.g., in the evening right after people finish the workday).

Figure 5:
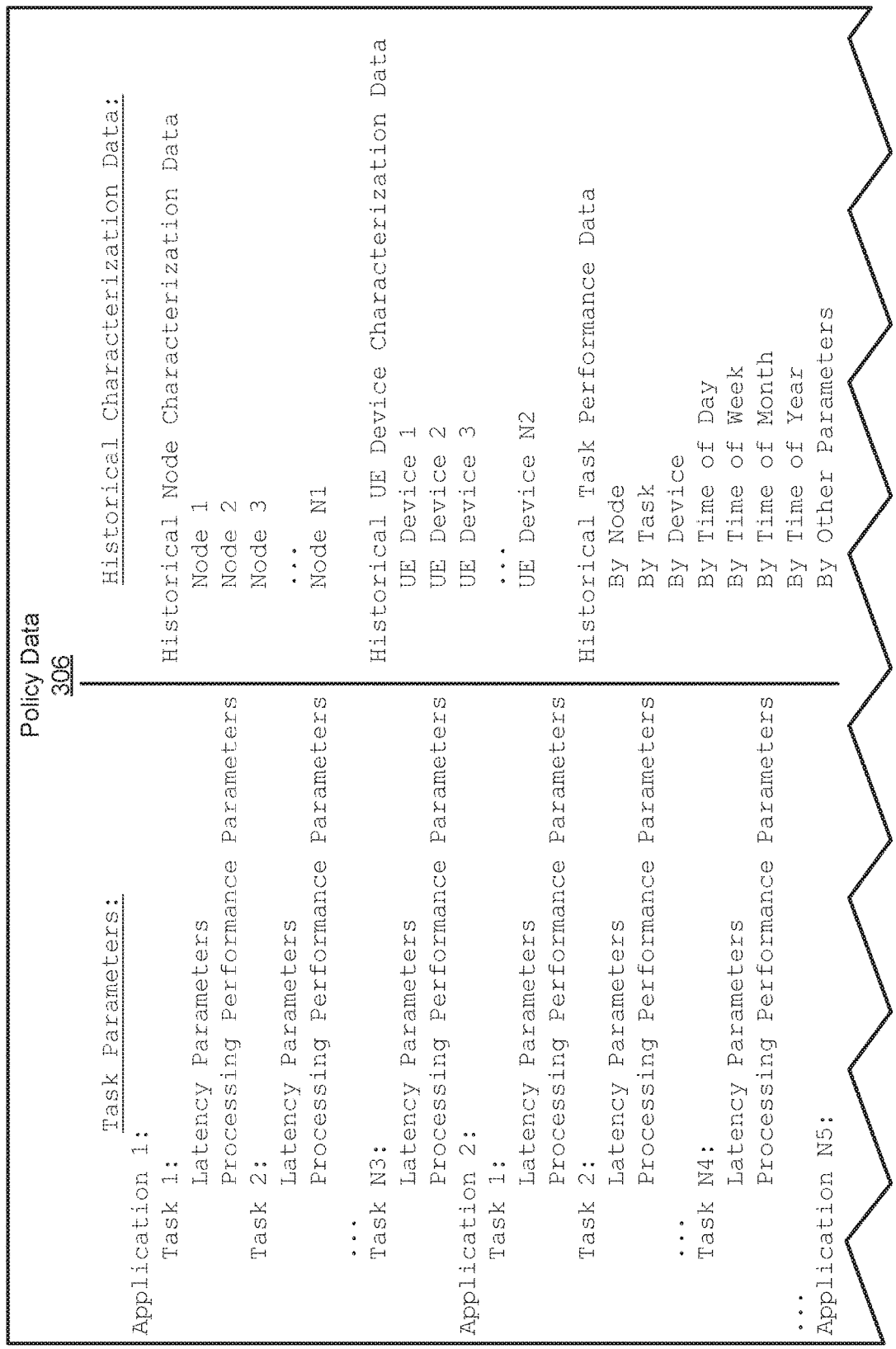
FIG. 5 illustrates exemplary policy data used by the edge compute orchestration system of FIG. 1 to selectively assign the edge compute task to the edge compute node according to principles described herein.

FIG. 5 illustrates exemplary policy data 306 that may be used by system 100 to selectively assign an edge compute task to an appropriate node 204 in accordance with principles described herein. Edge compute tasks for each application (e.g., including application 320 executing on UE device 206) may each be associated with certain performance requirements, such as an amount of latency that the application can bear for the task (e.g., a total latency that includes transport or travel-time latency, radio latency, processing time latency, etc.), the processing resources (e.g., number of virtual processors, amount of memory and storage, networking bandwidth, etc.) required to perform the task, and so forth. Accordingly, as shown in FIG. 5, policy data 306 includes data representative of various recommendations, requirements, and so forth ("Task Parameters") associated with each of various tasks of various applications. Specifically, for example, policy data 306 designates parameters corresponding to "Task 1" through "Task N3" of "Application 1"; "Task 1" through "Task N4" of "Application 2"; and so on for each application up to "Application N5." As will be described in more detail below, these recommended and/or required parameters for each edge compute task may be accounted for by system 100 when selecting an appropriate edge compute node in Operation 4.

The task recommendations and/or requirements may include various types of parameters defining recommended and/or required latencies for each edge compute task ("Latency Parameters"), recommended and/or required computing resources for processing each edge compute task ("Processing Performance Parameters"), and any other performance requirements and/or recommendations as may be associated with a particular edge compute task in a particular implementation. In some examples, these parameters may be designated by developers of the applications during a registration process for new applications that require or request to leverage edge compute technology when running on communication network 202. Accordingly, it will be understood that N3 and N4 are integers that may represent the number of tasks registered for Applications 1 and 2, respectively, while N5 is an integer that may represent the total number of applications that have been registered with system 100. In the same or other examples, the parameters shown in policy data 306 may additionally or alternatively be provided to system 100 as part of the data making up the task assignment request received in Operation 1.

Along with accounting for dynamic and static node characterization data 310 and/or UE device characterization data 312 when selectively assigning edge compute tasks to multi-access edge compute nodes, system 100 may further account for historical characterization data such as characterization data 310 and 312 that has been accessed previously and stored in policy data 306 or otherwise accounted for in the node selection policy by policy management block 304. Accordingly, FIG. 5 shows that policy data 306 may further include, along with the task parameters, various types of characterization data that has been accessed in the past ("Historical Characterization Data"). Specifically, as shown, policy data may include dynamic and/or static node characterization data 310 accessed in the past for each node 204 ("Historical Node Characterization Data" for "Node 1" through "Node N1"), and dynamic and/or static UE device characterization data 312 accessed in the past for each node 204 ("Historical UE Device Characterization Data" for "UE Device 1" through "UE Device N2"). This data may be stored in a similar format as received, or may be reflected in policy rules and procedures that have been updated and improved (e.g., using machine learning technology 308) to account for the historical characterization data.

Additionally, as further shown in FIG. 5, the historical characterization data stored in policy data 306 may include performance data (e.g., latency statistics, processing performance statistics, etc.) organized so as to provide any of the types of insights described above. For example, as shown under "Historical Task Performance Data," such performance data may be used by machine learning technology 308 to track performance by edge compute node ("By Node"), by edge compute task ("By Task"), by UE device ("By Device"), by time ("By Time of Day," "By Time of Week," "By Time of Month," "By Time of Year," etc.), or in any other manner as may serve a particular implementation ("By Other Parameters"). Using any of the data shown in FIG. 5 or any other suitable policy data that may be maintained by policy management block 304, system 100 may manage a node selection policy that, when adhered to by scheduler 302, may facilitate the balancing of node performance and node efficiency for edge compute tasks that are assigned to be performed by different nodes 204 in communication network 202.

Returning to FIG. 3, Operation 4 is shown to be performed by scheduler 302 within system 100. Operation 4 may be performed by selecting, from the set of all the nodes 204 in communication network 202, a particular node 204 (i.e., the node 204 shown in FIG. 3) for performance of the edge compute task for which the task assignment request was made. As such, Operation 4 may be performed in response to the receiving of the task assignment request in Operation 1, based on the characterization data accessed in Operation 2, and in accordance with the node selection policy managed in Operation 3.

The selecting of an appropriate node 204 (e.g., the most ideal or optimal node 204 according to the node selection policy) in Operation 4 may be accomplished in any manner as may serve a particular implementation. For example, in certain implementations, scheduler 302 may be configured to identify (e.g., in response to the task assignment request received in Operation 1) a set of performance parameters associated with the edge compute task. These performance parameters may be stored in policy data 306 or may be represented by the task assignment request, as was described above. Scheduler 302 may then analyze several or all of nodes 204 in the set of nodes in communication network 202 in order to identify a subset of these nodes that may be possible candidates for the final selection. More particularly, scheduler 302 may determine, based on node characterization data 310, that each node 204 of a subset of nodes 204 is capable of performing the edge compute task in accordance with the identified set of performance parameters. For example, scheduler 302 may account for what the required and/or recommended latency is for the edge compute task, how many computing resources are required and/or recommended for the edge compute task, and identify possible candidate nodes 204 that have sufficient available resources and are near enough to a current location of UE device 206 to be able to satisfy these parameters.

In forming this subset of potential candidate nodes 204, it may be desirable to identify nodes 204 that satisfy the parameters but that do not exceed the parameters by a large amount. For instance, if a node 204 is determined to satisfy the processing performance parameters and can do so in a small fraction of the total latency recommended for the edge compute task, it may be determined that this node 204 is "overqualified" to take on this task and is likely to not be a good choice for maximizing node efficiency. In contrast, in certain implementations or when UE device 206 is in certain geographies (e.g., in close proximity to one or more intermediate or central edge compute nodes), it may be the case that a high performance node 204 also happens to be highly efficient, making it an optimal choice in spite of being "overqualified." For instance, if UE device 206 happens to be near node 204-L1, node 204-L1 may be both a high performance and a high efficiency option for performing the edge compute task, because node 204-L1 is both close enough to UE device 206 to provide a relatively low latency and large enough to be relatively low cost.

The factors accounted for in determining which nodes 204 are capable of satisfying a given set of performance parameters (e.g., in order to form the subset of candidate nodes 204) may include any suitable factors. For example, in addition to accounting for round-trip transport latency (i.e., the travel time that it takes for a signal to propagate across a portion of communication network 202), scheduler 302 may also account for other types of latency such as radio latency (i.e., the incidental delay added by components of communication network 202 as the signal is transmitted and/or received), processing latency (i.e., the amount of time to queue an edge compute task at the selected node 202, perform appropriate computations in accordance with the task, and begin transmitting data back to UE device 206), and so forth. As a result, latency budgets may account for a tight requirement in one type of latency by loosening the requirement in another type of latency. For example, if a particularly processing-intensive edge compute task requires a relatively large amount of processing latency, some of that time may be found in the budget by requiring a lower round-trip transport latency, while, if a less processing-intensive edge compute task requires very little processing latency, that task may be able to afford a higher round-trip transport latency.

The subset of nodes 204 may include multiple nodes from the same edge compute node category and/or nodes from multiple different edge compute node categories. For example, the subset of nodes 204 determined in certain examples may include a node 204 from each of at least two of the local, intermediate, and central edge compute node categories (e.g., a node 204-L1 and a node 204-L2, a node 204-L1 and a node 204-L3, or a node 204-L2 and a node 204-L3). As another example, the subset of nodes 204 may include a plurality of edge compute nodes from one of the local, intermediate, and central edge compute node categories (e.g., multiple nodes 204-L1, multiple nodes 204-L2, and/or multiple nodes 204-L3). As shown, machine learning technology 308 may be configured to facilitate node selection performed by scheduler 302 directly (e.g., by helping scheduler 302 efficiently determine the subset of candidate nodes 204 to include only the most relevant and appropriate edge compute nodes in communication network 202), or by improving the node selection policy managed by policy management block 304 as described above.

Once the subset of candidate nodes 204 is determined, scheduler 302 may be configured to designate as the selected node 204 a particular node 204 of the subset of candidate nodes. For example, scheduler 302 may designate a first edge compute node that is predicted to achieve a balance between the node performance and the node efficiency that is superior (e.g., according to criteria set forth in the node selection policy) to a balance predicted to be achieved by one or more other nodes 204 of the subset of candidate nodes. For example, in accordance with the node selection policy, scheduler 302 may designate which candidate node is to be assigned the edge compute task by determining which of the candidate nodes would be most efficient (e.g., which node is the largest and/or most centralized), which of the candidate nodes would be geographically closest to the position of UE device 206, which of the candidate nodes would provide the lowest overall latency for the edge compute task, which of the candidate nodes is the least utilized at the moment, which of the candidate nodes is likely to have the most availability in the near future (e.g., based on historical trends), or which of the candidate nodes best satisfies any other criteria as may be included in the node selection policy in a particular implementation.

Figure 6:
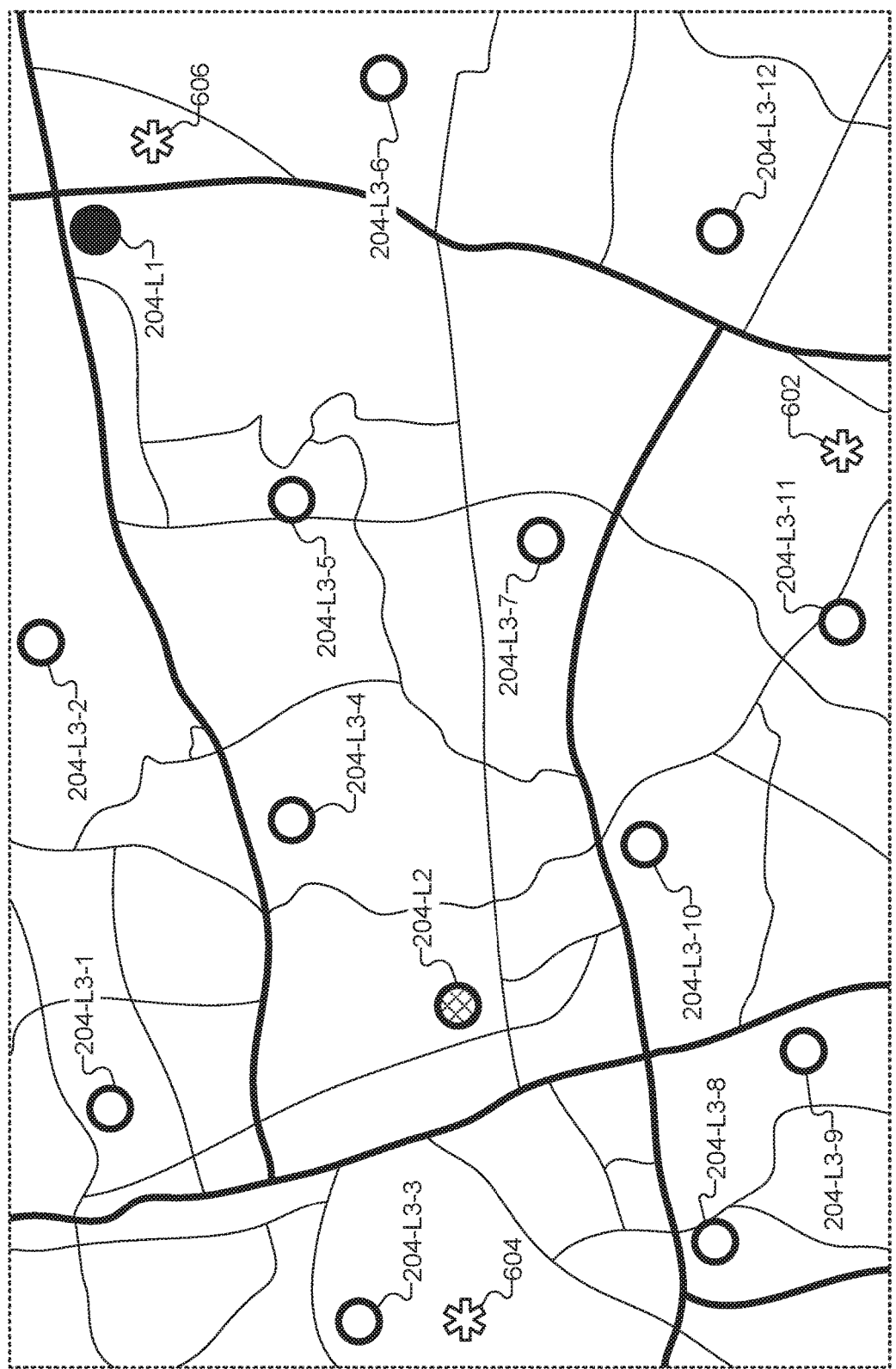
FIG. 6 illustrates different possible geolocations at which a user equipment ("UE") device may be located in relation to respective geolocations of a set of edge compute nodes according to principles described herein.

To illustrate how Operation 4 may be performed in accordance with an exemplary node selection policy (e.g., the policy managed by policy management block 304 in Operation 3), FIG. 6 shows an exemplary map 600 depicting different possible geolocations for UE device 206 in relation to respective geolocations of various edge compute nodes 204 that are available to be assigned edge compute tasks for UE device 206. More specifically, various nodes 204-L1 (represented by a blackened circular icon), 204-L2 (represented by a shaded circular icon), and 204-L3 (represented by hollow circular icons) are depicted on map 600 at various geolocations across a geographical area. As shown, there are a relatively large number of local edge compute nodes 204-L3 (e.g., individually numbered as nodes 204-L3-1 through 204-L3-12 to be distinguishably referenced in the description below), while there are only one each of intermediate edge compute node 204-L2 and central edge compute node 204-L3. Also shown in FIG. 6 are three geolocations 602, 604, and 606, each of which represents a potential location at which UE device 206 may be located when generating a task assignment request and utilizing a selected edge compute node to execute application 320.

A first example will be considered in which UE device 206 is located at geolocation 602. In this example, system 100 may determine, based on accessed node characterization data 310, that only nodes 204-L3-7, 204-L3-10, 204-L3-11, and 204-L3-12 are capable of performing the edge compute task in accordance with a set of performance parameters that has been identified. For example, other more efficient nodes such as nodes 204-L1 and 204-L2 may be determined to be far enough away that the latency for the particular edge compute task would be too great to satisfy the performance parameters. Accordingly, system 100 may designate node 204-L3-11 as the selected edge compute node because no other candidate node would be more efficient and node 204-L3-11 may provide the best performance (e.g., the lowest latency) or other desirable benefits.

In a second example, UE device 206 may be located at geolocation 604. In this example, system 100 may determine, again based on accessed node characterization data 310, that only nodes 204-L3-3, 204-L3-8, and 204-L2 are capable of performing the edge compute task in accordance with a set of performance parameters that has been identified. Here again, other more efficient nodes such as nodes 204-L1 may be determined to be far enough away that the latency for the particular edge compute task would be too great to satisfy the performance parameters. While node 204-L3-3 is the closest node to geolocation 604 and may thus be determined to provide the best node performance (e.g., the lowest latency) of any of the candidate nodes, system 100 may designate node 204-L2 as the selected edge compute node instead of node 204-L3-3. This is because the performance of either node 204-L3-3 or 204-L2 would be sufficient to satisfy the performance parameters required for the edge compute task, but, as has been described above, intermediate node 204-L2 may provide a greater node efficiency than local node 204-L3-3. For example, this increased efficiency may arise because, if every edge compute task that has to be performed from geolocation 604 is assigned to intermediate node 204-L2 rather than to 204-L3-3, more computing resources may be deployed and maintained at the larger intermediate node 204-L2 while fewer resources (e.g., only enough resources for situations where local nodes are exclusively capable of satisfying performance parameters) may be deployed and maintained at the smaller local node 204-L3-3.

In a third example, UE device 206 may be located at geolocation 606. In this example, system 100 may determine, again based on accessed node characterization data 310, that any of nodes 204 shown on map 600 would be capable of performing the edge compute task in accordance with a set of performance parameters that has been identified. In this example, the performance parameters for the edge compute task in question are relatively permissive, allowing for great flexibility in which edge compute node is selected. In such situations, the selected edge compute node may commonly be a node with relatively low performance (e.g., a node that is relatively far away from UE device 206 and thus has a relatively high latency) but high efficiency. However, in this example, geolocation 606 is coincidentally nearby central node 204-L1, which happens to provide the highest node efficiency and the highest node performance of all of the potential candidate nodes. Accordingly, system 100 may designate node 204-L1 as the selected edge compute node due to the high node efficiency node 204-L1 can provide, despite that the node performance provided by node 204-L1 happens to be significantly surpass the baseline required or recommended by the set of performance parameters.

Returning to FIG. 3, system 100 (e.g., scheduler 302) assigns the edge compute task to be performed by the selected edge compute node (i.e., the node 204 shown in FIG. 3 in this example) in Operation 5. As shown by the two separate arrows associated with Operation 5, this assignment may be performed in multiple or alternative ways. For example, system 100 may transmit a message to the selected node 204 to indicate that another task 318 has been assigned and should be received from UE device 206. Additionally or alternatively, system 100 may transmit a message to UE device 206 indicating which node 204 has been designated to perform the edge compute task so that UE device 206 may provide the task to that node 204 as shown by Operation 6. Regardless of how this assignment is implemented, UE device 206 provides the task 318 to node 204 in Operation 6, and the task is carried out by node 204.

As shown, scheduler 302 may provide the assignment to scheduler 316, which is included within controller 314 of node 204. It will be understood that edge compute task scheduling may thus be a hierarchical process in certain examples. For instance, scheduler 302 may be in control of which node 204 is assigned which task 318, and each respective local scheduler of each node 204 (e.g., scheduler 316 for the node 204 shown in FIG. 3) may in turn be in control of how different tasks 318 (of the hundreds to potentially millions of tasks 318 that may be assigned to the node) are scheduled to be performed by a corresponding node controller performing the tasks (e.g., controller 314 for the node 204 shown in FIG. 3). For example, one task 318 may be prioritized over another task 318 depending on the respective latency budget of each task so as to provide the best performance for each task.

Figure 7:
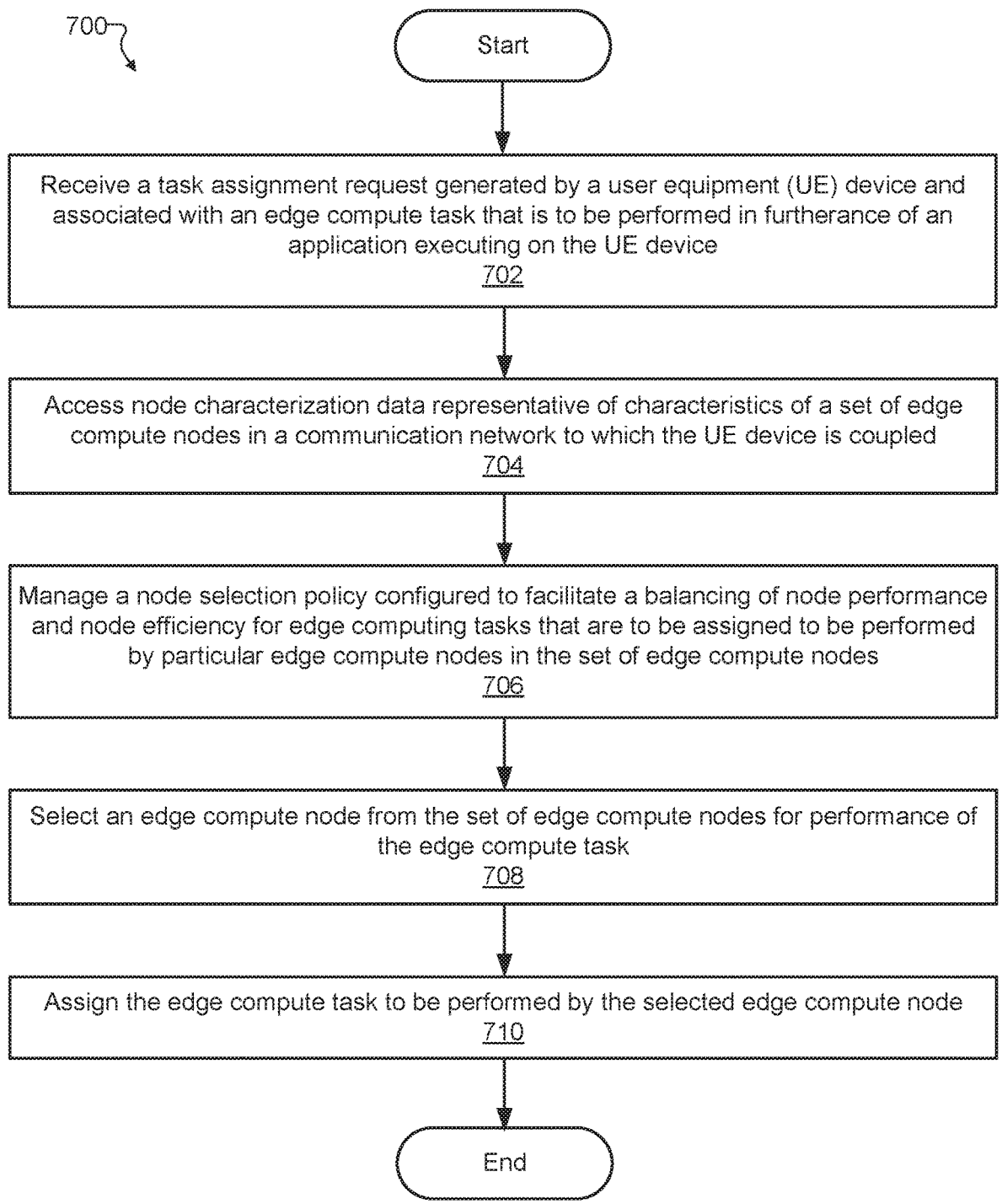
FIG. 7 illustrates an exemplary method for intelligent distribution of workloads to multi-access edge compute nodes on a communication network according to principles described herein.

FIG. 7 illustrates an exemplary method 700 for intelligent distribution of workloads to multi-access edge compute nodes on a communication network. While FIG. 7 illustrates exemplary operations according to one embodiment, other embodiments may omit, add to, reorder, and/or modify any of the operations shown in FIG. 7. One or more of the operations shown in FIG. 7 may be performed by system 100, any components included therein, and/or any implementation thereof.

In operation 702, an edge compute orchestration system may receive a task assignment request generated by a UE device. For example, the edge compute orchestration system may be communicatively coupled with a set of edge compute nodes in a communication network, and the UE device may also be communicatively coupled to the communication network. In operation 702, the task assignment request may be associated with an edge compute task that is to be performed in furtherance of an application executing on the UE device. Operation 702 may be performed in any of the ways described herein.

In operation 704, the edge compute orchestration system may access node characterization data representative of characteristics of the set of edge compute nodes in the communication network. Operation 704 may be performed in any of the ways described herein.

In operation 706, the edge compute orchestration system may manage a node selection policy. For example, the node selection policy may be configured to facilitate a balancing of node performance and node efficiency for edge computing tasks that are to be assigned to be performed by particular edge compute nodes in the set of edge compute nodes. Operation 706 may be performed in any of the ways described herein.

In operation 708, the edge compute orchestration system may select, from the set of edge compute nodes, an edge compute node for performance of the edge compute task. For example, the edge compute orchestration system may select the edge compute node in response to receiving the task assignment request in operation 702, and may do so based on the node characterization data accessed in operation 704 and in accordance with the node selection policy managed in operation 706. Operation 708 may be performed in any of the ways described herein.

In operation 710, the edge compute orchestration system may assign the edge compute task to be performed by the edge compute node selected in operation 708. Operation 710 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 8:
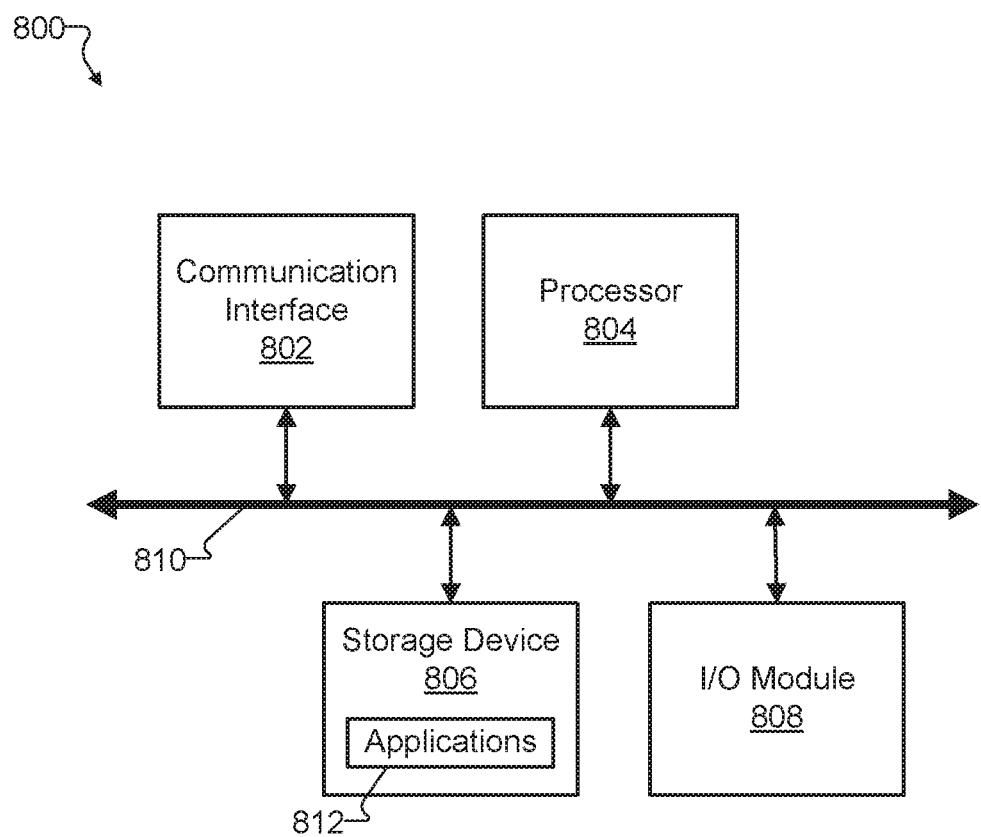
FIG. 8 illustrates an exemplary computing device according to principles described herein.

FIG. 8 illustrates an exemplary computing device 800 that may be specifically configured to perform one or more of the processes described herein. For example, computing device 800 may include multi-access edge computing technologies (e.g., a virtualization layer, a hypervisor, an edge controller, etc.) to implement a system such as system 100 or an edge compute node 204, or may implement any of the other computing devices (e.g., UE device 206, etc.) described herein. As shown in FIG. 8, computing device 800 may include a communication interface 802, a processor 804, a storage device 806, and an input/output ("I/O") module 808 communicatively connected via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 806. For example, data representative of one or more executable applications 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. One or more I/O modules may be used to receive input for a single virtual experience. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with processing facility 104 of system 100. Likewise, storage facility 102 of system 100 may be implemented by or within storage device 806.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    receiving, by an edge compute orchestration system that is communicatively coupled with a set of edge compute nodes in a communication network, a task assignment request generated by a user equipment (UE) device communicatively coupled to the communication network, the task assignment request associated with an edge compute task that is to be performed in furtherance of an application executing on the UE device;
    determining, by the edge compute orchestration system, a latency parameter for the edge compute task;
    accessing, by the edge compute orchestration system, node characterization data representative of characteristics of the set of edge compute nodes;
    determining, by the edge compute orchestration system and based on the accessed node characterization data:
        respective round-trip transport latencies between the UE device and each edge compute node in the set of edge compute nodes, and
        respective numbers of parallel processors included in each edge compute node in the set of edge compute nodes;
    determining, by the edge compute orchestration system, a subset of the set of edge compute nodes that are capable, based on the respective round-trip transport latencies, of performing the edge compute task in accordance with the latency parameter for the edge compute task;
    selecting, by the edge compute orchestration system, an edge compute node for performance of the edge compute task, the edge compute node selected to be whichever of the edge compute nodes in the subset includes a largest number of parallel processors of the respective numbers of parallel processors; and
    assigning, by the edge compute orchestration system, the edge compute task to be performed by the selected edge compute node.

2. The method of claim 1, wherein the subset of edge compute nodes includes an edge compute node from each of at least two of the following edge compute node categories:
    a local edge compute node category,
    an intermediate edge compute node category, and
    a central edge compute node category.

3. The method of claim 1, wherein the subset of edge compute nodes includes a plurality of edge compute nodes from one of the following edge compute node categories:
    a local edge compute node category,
    an intermediate edge compute node category, and
    a central edge compute node category.

4. The method of claim 1, further comprising:
    managing, by the edge compute orchestration system, node selection policy data upon which is based the selecting of the edge compute node as whichever of the edge compute nodes in the subset includes the largest number of parallel processors; and
    using machine learning techniques to update the node selection policy data based on the node characterization data that is accessed and based on historical node characterization data accessed previously.

5. The method of claim 4, wherein the latency parameter for the edge compute task includes:
    a maximum latency parameter for the edge compute task; and
    a minimum processing performance parameter for the edge compute task.

6. The method of claim 1, wherein the characteristics of the set of edge compute nodes represented by the node characterization data include at least one of:
    a dynamic workload of a particular edge compute node in the set of edge compute nodes,
    a dynamic resource availability of the particular edge compute node, and
    a dynamic security status of the particular edge compute node.

7. The method of claim 1, wherein the characteristics of the set of edge compute nodes represented by the node characterization data include at least one of:
    a static geographical location of a particular edge compute node in the set of edge compute nodes, and
    a static list of processing resources included in the particular edge compute node.

8. The method of claim 1, further comprising accessing, by the edge compute orchestration system together with the accessing of the node characterization data, UE device characterization data representative of characteristics of the UE device;
    wherein the selecting of the edge compute node as whichever of the edge compute nodes in the subset includes the largest number of parallel processors is performed based on the UE device characterization data.

9. A system comprising:
    a memory storing instructions; and
    a processor communicatively coupled to the memory and configured to execute the instructions to:
        receive a task assignment request generated by a user equipment (UE) device communicatively coupled to a communication network, the task assignment request associated with an edge compute task that is to be performed in furtherance of an application executing on the UE device;

determine a latency parameter for the edge compute task;

access node characterization data representative of characteristics of a set of edge compute nodes that are communicatively coupled with the system in the communication network;

determine, based on the accessed node characterization data:
- respective round-trip transport latencies between the UE device and each edge compute node in the set of edge compute nodes, and
- respective numbers of parallel processors included in each edge compute node in the set of edge compute nodes;

determine a subset of the set of edge compute nodes that are capable, based on the respective round-trip transport latencies, of performing the edge compute task in accordance with the latency parameter for the edge compute task;

select an edge compute node for performance of the edge compute task, the edge compute node selected to be whichever of the edge compute nodes in the subset includes a largest number of parallel processors of the respective numbers of parallel processors; and assign the edge compute task to be performed by the selected edge compute node.

10. The system of claim 9, wherein the subset of edge compute nodes includes an edge compute node from each of at least two of the following edge compute node categories:
- a local edge compute node category,
- an intermediate edge compute node category, and
- a central edge compute node category.

11. The system of claim 9, wherein the subset of edge compute nodes includes a plurality of edge compute nodes from one of the following edge compute node categories:
- a local edge compute node category,
- an intermediate edge compute node category, and
- a central edge compute node category.

12. The system of claim 9, wherein the processor is further configured to execute the instructions to:
- manage node selection policy data upon which is based the selecting of the edge compute node as whichever of the edge compute nodes in the subset includes the largest number of parallel processors; and
- using machine learning techniques to update the node selection policy data based on the node characterization data that is accessed and based on historical node characterization data accessed previously.

13. The system of claim 12, wherein the latency parameter for the edge compute task includes:
- a maximum latency parameter for the edge compute task; and
- a minimum processing performance parameter for the edge compute task.

14. The system of claim 9, wherein the characteristics of the set of edge compute nodes represented by the node characterization data include at least one of:
- a dynamic workload of a particular edge compute node in the set of edge compute nodes,
- a dynamic resource availability of the particular edge compute node, and
- a dynamic security status of the particular edge compute node.

15. The system of claim 9, wherein the characteristics of the set of edge compute nodes represented by the node characterization data include at least one of:
- a static geographical location of a particular edge compute node in the set of edge compute nodes, and
- a static list of processing resources included in the particular edge compute node.

16. The system of claim 9, wherein:
the processor is further configured to execute the instructions to access, together with the accessing of the node characterization data, UE device characterization data representative of characteristics of the UE device; and
the selecting of the edge compute node as whichever of the edge compute nodes in the subset includes the largest number of parallel processors is performed based on the UE device characterization data.

17. A non-transitory computer-readable medium storing instructions that, when executed, direct a processor of an edge compute orchestration system to:

receive a task assignment request generated by a user equipment (UE) device communicatively coupled to a communication network, the task assignment request associated with an edge compute task that is to be performed in furtherance of an application executing on the UE device;

determine a latency parameter for the edge compute task;

access node characterization data representative of characteristics of a set of edge compute nodes that are communicatively coupled with the edge compute orchestration system in the communication network;

determine, based on the accessed node characterization data:
- respective round-trip transport latencies between the UE device and each edge compute node in the set of edge compute nodes, and
- respective numbers of parallel processors included in each edge compute node in the set of edge compute nodes;

determine a subset of the set of edge compute nodes that are capable, based on the respective round-trip transport latencies, of performing the edge compute task in accordance with the latency parameter for the edge compute task;

select an edge compute node for performance of the edge compute task, the edge compute node selected to be whichever of the edge compute nodes in the subset includes a largest number of parallel processors of the respective numbers of parallel processors; and assign the edge compute task to be performed by the selected edge compute node.

18. The method of claim 1, further comprising storing, by the edge compute orchestration system, data representative of one or more registered applications configured to execute on the UE device, wherein:
the edge compute task is associated with at least one of the one or more registered applications and the latency parameter is included in a plurality of parameters stored for the edge compute task; and
the determining of the latency parameter includes accessing the stored data representative of the one or more registered applications.

19. The system of claim 9, wherein:
the processor is further configured to execute the instructions to store data representative of one or more registered applications configured to execute on the UE device;
the edge compute task is associated with at least one of the one or more registered applications and the latency parameter is included in a plurality of parameters stored for the edge compute task; and the determining of the latency parameter includes accessing the stored data representative of the one or more registered applications.

20. The non-transitory computer-readable medium of claim 17, wherein:
the instructions further direct the processor to store data representative of one or more registered applications configured to execute on the UE device;
the edge compute task is associated with at least one of the one or more registered applications and the latency parameter is included in a plurality of parameters stored for the edge compute task; and
the determining of the latency parameter includes accessing the stored data representative of the one or more registered applications.

* * * * *